(12) United States Patent  
Kirby et al.

(10) Patent No.: US 8,009,276 B1
(45) Date of Patent: Aug. 30, 2011

(54) SYSTEM AND METHOD OF SURFACE WAVE IMAGING TO MAP PRESSURE ON A SURFACE

(75) Inventors: Kevin W. Kirby, Calabasas, CA (US); Daniel J. Gregoire, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 654 days.

(21) Appl. No.: 12/144,052

(22) Filed: Jun. 23, 2008

(51) Int. Cl.
*G01B 11/16* (2006.01)

(52) U.S. Cl. .......................................................... 356/32

(58) Field of Classification Search .................... 356/32, 356/34
See application file for complete search history.

(56) References Cited

U.S. PATENT DOCUMENTS

| | | | |
|---|---|---|---|
| 4,892,906 | A | 1/1990 | Pham et al. |
| 5,650,461 | A | 7/1997 | Wasserman et al. |
| 6,531,537 | B2 | 3/2003 | Friel et al. |
| 2004/0042077 | A1 | 3/2004 | Birge et al. |
| 2004/0164682 | A1 | 8/2004 | Hopwood et al. |
| 2004/0175407 | A1 | 9/2004 | McDaniel |
| 2004/0224145 | A1 | 11/2004 | Weir et al. |
| 2004/0256056 | A1 | 12/2004 | Hall et al. |
| 2005/0058689 | A1 | 3/2005 | McDaniel |
| 2005/0126441 | A1 | 6/2005 | Skelhorn |
| 2006/0141003 | A1 | 6/2006 | McDaniel |
| 2008/0319375 | A1* | 12/2008 | Hardy ............................. 604/22 |

OTHER PUBLICATIONS

Daniels, "On the Ionization of Air for Removal of Noxious Effluvia (Air Ionization of Indoor Environments for Control of Volatile and Particulate Contaminants with Nonthermal Plasmas Generated by Dielectric-Barrier Discharge," IEEE Transactions on Plasma Science, vol. 30, No. 4, Aug. 2002, pp. 1471-1481.

Deng, et al., "Physical Mechanisms of Inactivation of *Bacillus subtilis* Spores Using Cold Atmospheric Plasmas," IEEE Transactions on Plasma Science, vol. 34, No. 4, Aug. 2006, pp. 1310-1316.

Herrmann, et al., "Chemical Warfare Agent Decontamination Studies in the Plasma Decon Chamber," IEEE Transactions on Plasma Science, vol. 30, No. 4, Aug. 2002, pp. 1460-1470.

Laroussi, "Nonthermal Decontamination of Biological Media by Atmospheric-Pressure Plasmas: Review, Analysis, and Prospects," IEEE Transactions on Plasma Science, vol. 30, No. 4, Aug. 2002, pp. 1409-1415.

Montie, et al., "An Overview of Research Using the One Atmosphere Uniform Glow Discharge Plasma (OAUGDP) for Sterilization of Surfaces and Materials," IEEE Transactions on Plasma Science, vol. 28, No. 1, Feb. 2000, pp. 41-50.

* cited by examiner

*Primary Examiner* — Roy Punnoose
(74) *Attorney, Agent, or Firm* — Christie, Parker, Hale

(57) ABSTRACT

A system and a method for detecting surface pressure on a surface is provided. A plurality of transponders are located on the surface for transmitting electromagnetic surface waves and for receiving the electromagnetic surface waves upon being reflected, diffracted, refracted, scattered, or otherwise altered by pressure variations on the surface. A controller is coupled to the plurality of transponders. The controller is adapted to coordinate the plurality of transponders for imaging the pressure variations on the surface. The surface includes a surface-wave medium and the surface-wave medium is pressure-sensitive.

29 Claims, 7 Drawing Sheets

SYSTEM AND METHOD OF SURFACE WAVE IMAGING TO MAP PRESSURE ON A SURFACE

CROSS-REFERENCE TO RELATED APPLICATION(S)

This application is related to the following patent applications, all of which are incorporated herein by reference: U.S. patent application Ser. No. 12/144,073, filed Jun. 23, 2008, now U.S. Pat. No. 7,719,694, issued May 18, 2010, entitled "System and Method of Surface Wave Imaging to Detect Ice on a Surface or Damage to a Surface"; U.S. patent application Ser. No. 12/144,134, filed Jun. 23, 2008, now U.S. Pat. No. 7,931,858, issued Apr. 26, 2011, entitled "System and Method for Surface Decontamination Using Electromagnetic Surface Waves"; U.S. patent application Ser. No. 12/144,170, filed Jun. 23, 2008, entitled "System and Method for De-icing Using Electromagnetic Surface Waves"; and U.S. patent application Ser. No. 12/144,123, filed Jun. 23, 2008, entitled "System and Method for Large Scale Atmospheric Plasma Generation." This application is also related to U.S. Pat. No. 7,307,589 entitled "Large-Scale Adaptive Surface Sensor Arrays," which is incorporated herein by reference.

BACKGROUND OF THE INVENTION

1. Field of the Invention

The present invention relates to electromagnetic surface waves, and in particular, to a system and a method of surface wave imaging to map pressure on a surface.

2. Description of Related Art

A conventional method of measuring surface pressure is to apply pressure taps or transducers to the surface, but these approaches have some significant disadvantages. Taps and transducers only allow measurements at discrete points on the surface. The surface pressures at other locations can only be interpolated from the known points. Another disadvantage is that taps and transducers are intrusive to the flow. Measurements cannot be taken downstream of other taps or transducers, since the flow is altered once it passes over the upstream disturbances. Finally, taps and transducers are time-consuming and expensive to use. Determining surface loads in aircraft design typically cost $500,000 to $1 million, with approximately 30% of that cost going towards the pressure taps and their installation.

Another method of measuring surface pressure utilizes pressure sensitive paint (PSP). PSP is essentially a luminescent dye dispersed in an oxygen permeable binder. The dye is excited by absorbing UV light; it then emits visible light. The intensity of the emitted light is dependent on the pressure of oxygen in the surrounding atmosphere. As the pressure of the oxygen above the PSP increases, the intensity of the emitted radiation will decrease. PSP provides a much greater spatial resolution than pressure taps, and disturbances in the flow are immediately observable. PSP also has the advantage of being a non-intrusive technique, since it does not affect the air flow across the surface.

PSP has the following disadvantages. 1) PSP coating degrades with time; 2) PSP response is temperature dependent; and 3) It requires excitation by an external source of UV, is only used in a controlled laboratory environment, and can't be used as a real time diagnostic.

Due to the disadvantages of using pressure taps to measure pressure on a surface and the undesirable characteristics of PSP, a need exists for an improved system and method for measuring pressure on a surface.

SUMMARY OF THE INVENTION

A system for detecting surface pressure on a surface is provided. A plurality of transponders are located on the surface for transmitting electromagnetic surface waves and for receiving the electromagnetic surface waves upon being reflected, diffracted, refracted, scattered, or otherwise altered by pressure variations on the surface. A controller is coupled to the plurality of transponders. The controller is adapted to coordinate the plurality of transponders for imaging the pressure variations on the surface.

In an exemplary embodiment of the present invention, the plurality of transponders are located at a perimeter of the surface.

In an exemplary embodiment of the present invention, a surface-wave medium is laminated to the surface, the surface-wave medium is pressure-sensitive.

In an exemplary embodiment, the surface-wave medium includes a compressible dielectric.

In an exemplary embodiment of the present invention, the surface-wave medium includes a conductive ground plane between the surface and the dielectric.

In an exemplary embodiment of the present invention, the surface-wave medium includes a metallic pattern on the dielectric for increasing an inductive reactance of the surface-wave medium.

In an exemplary embodiment of the present invention, the metallic pattern is a periodic.

In an exemplary embodiment of the present invention, the metallic pattern is a periodic metallic pattern of squares, rectangles, parallel or perpendicular hash marks, or Jerusalem crosses.

In an exemplary embodiment of the present invention, the received electromagnetic surface waves are analyzed and the received electromagnetic surface waves are compared to baseline signals for imaging the pressure variations on the surface.

A method of detecting surface pressure on a surface is provided. Electromagnetic surface waves are transmitted onto the surface. The electromagnetic surface waves are received upon being reflected, diffracted, refracted, scattered, or otherwise altered by pressure variations on the surface. The transmitting and the receiving of the electromagnetic surface waves is coordinated for imaging the pressure variations on the surface.

In an exemplary embodiment of the present invention, the electromagnetic surface waves are transmitted from a plurality of transmitters located at a perimeter of the surface and receiving the electromagnetic surface waves by the plurality of transmitters.

In an exemplary embodiment of the present invention, the plurality of transmitters are coordinated to transmit and to receive the electromagnetic surface waves for imaging the pressure variations on the surface.

A method of forming a surface pressure detection system on a surface is provided. A plurality of transponders are located on the surface for transmitting electromagnetic surface waves and for receiving the electromagnetic surface waves upon being reflected, diffracted, refracted, scattered, or otherwise altered by pressure variations on the surface. The plurality of transponders are coupled to a controller. The controller is adapted to coordinate the plurality of transponders, to analyze the received electromagnetic surface waves, and to compare the received electromagnetic surface waves to baseline signals for imaging the pressure variations on the surface.

DETAILED DESCRIPTION

In the description below, an introduction to electromagnetic surface-wave technology, including surface-wave communication and power technology is provided. Systems and methods are then provided for imaging pressure on a surface using electromagnetic surface waves.

Figure 1:
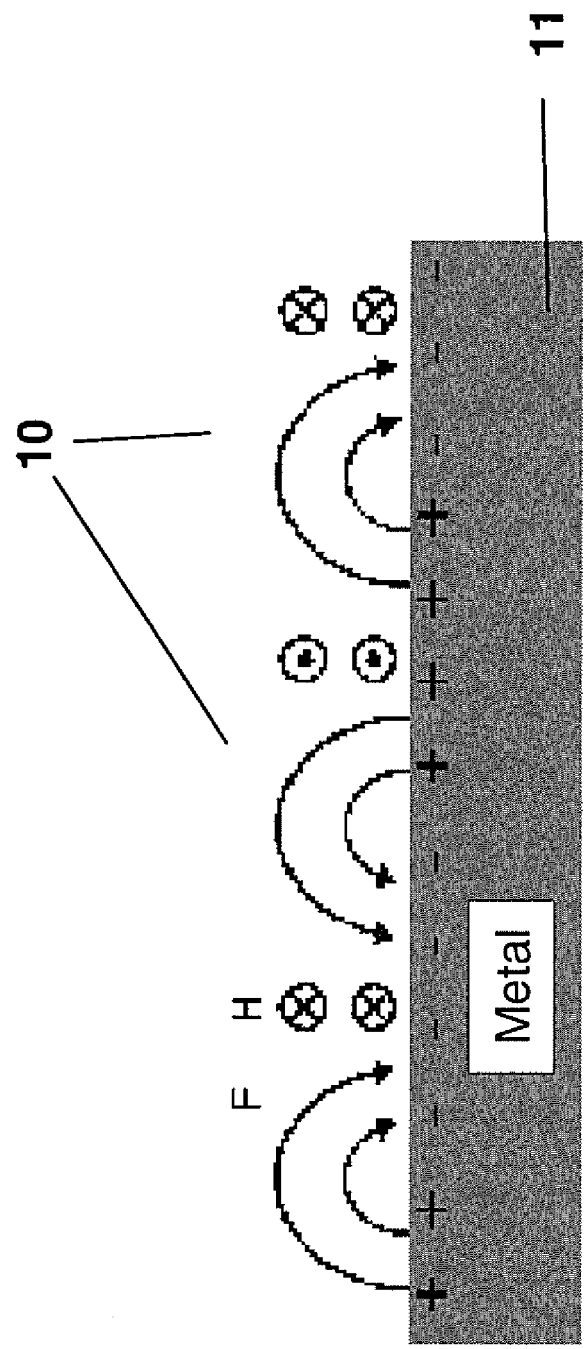
FIG. 1 depicts fields of a transverse magnetic surface wave on a flat metal surface.

FIG. 1 depicts a transverse magnetic (TM) surface wave 10 on a flat metal surface 11. A TM wave requires a surface with a surface impedance having an inductive term, while, in order to support a transverse electric (TE) surface wave, the reactive part of the surface impedance must be capacitive.

At optical frequencies, surface waves are known as surface plasmons. Surface waves are waves that are bound to the interface between a metal or other material and the surrounding space. The surface waves are characterized by longitudinally oscillating charges on the metal surface and associated fields in free space. On a flat metal surface, surface waves typically extend many thousands of wavelengths into the surrounding space. At low microwave frequencies, surface waves can extend many hundreds of meters into the surrounding space. Surfaces that allow surface waves to extend too far out into the surrounding space are not useful for wave guiding. Traditional techniques for creating surface wave media that confine fields closer to the surface generally involve thick dielectric coatings, which are not suitable for many military applications. Recent research has shown, however, that it is possible to produce thin, light-weight structures with textured-impedance surfaces that can have strong surface-wave guiding effects where the fields are confined close to the surface, do not readily leak power into free space, can follow curves in the surface, and have negligible propagation loss.

Figure 2:
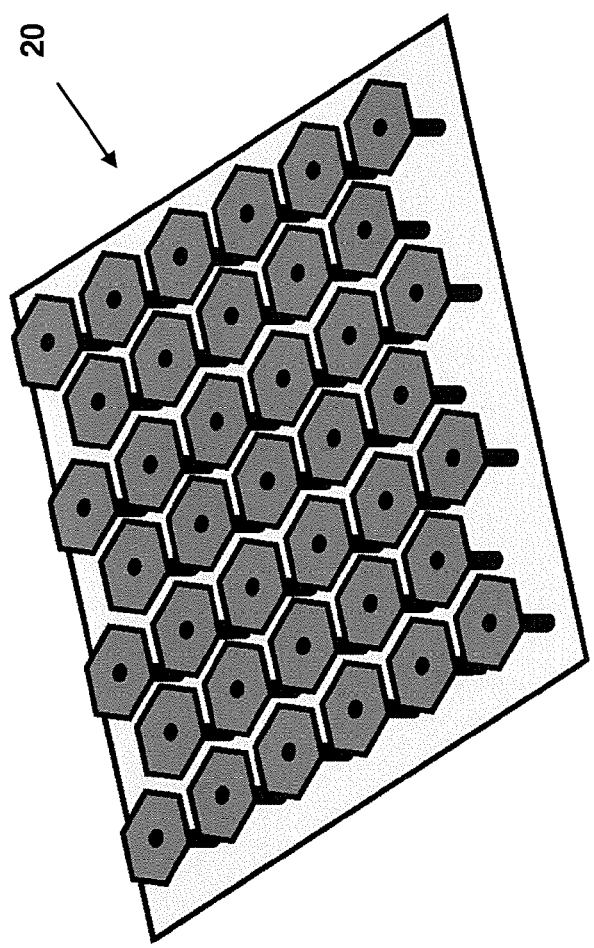
FIG. 2 depicts a periodic frequency-selective surface-wave guide having high impedance.
Figure 3:
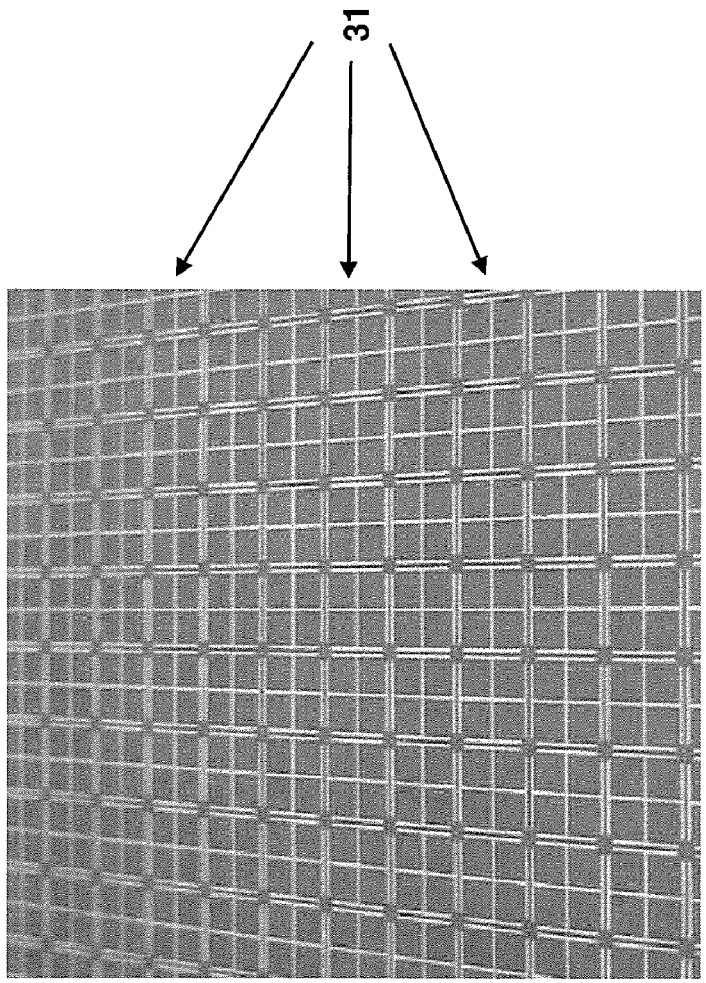
FIG. 3 depicts another periodic frequency-selective surface-wave guide having an array of Jerusalem Crosses.

FIG. 2 and FIG. 3 are two examples of textured-impedance surface geometries. A textured-impedance surface typically consists of a series of resonant structures tiled onto a thin flexible substrate. The complex geometry creates a medium that supports highly localized surface wave propagation by altering the surface impedance, such that the decay constant into free space is rapid, thus binding the wave to less than within a wavelength of the surface. A closely bound surface wave may be propagated along the surface with a small attenuation if the inductive reactance (i.e., reactive part of the surface impedance) is large and the resistance (i.e., real part of the surface impedance) is small. FIG. 2 depicts a two-layer high impedance surface-wave guide 20. FIG. 3 depicts a periodic frequency-selective surface-wave guide 30 having an array of Jerusalem Crosses 31. The surfaces depicted in FIG. 2 and FIG. 3 are inexpensive to manufacture and are readily integrated within structures.

Figure 4:
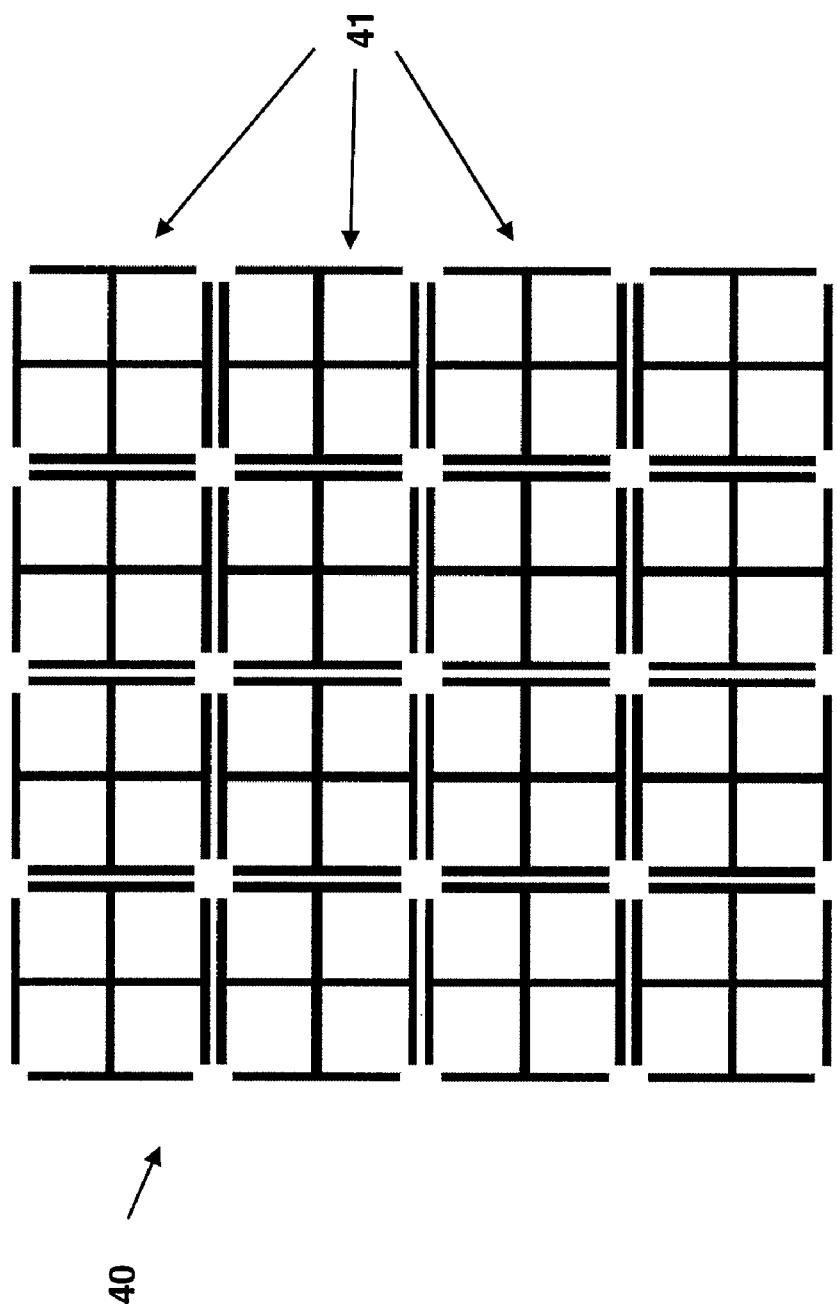
FIG. 4 is a schematic of an array of Jerusalem Crosses.
Figure 5:
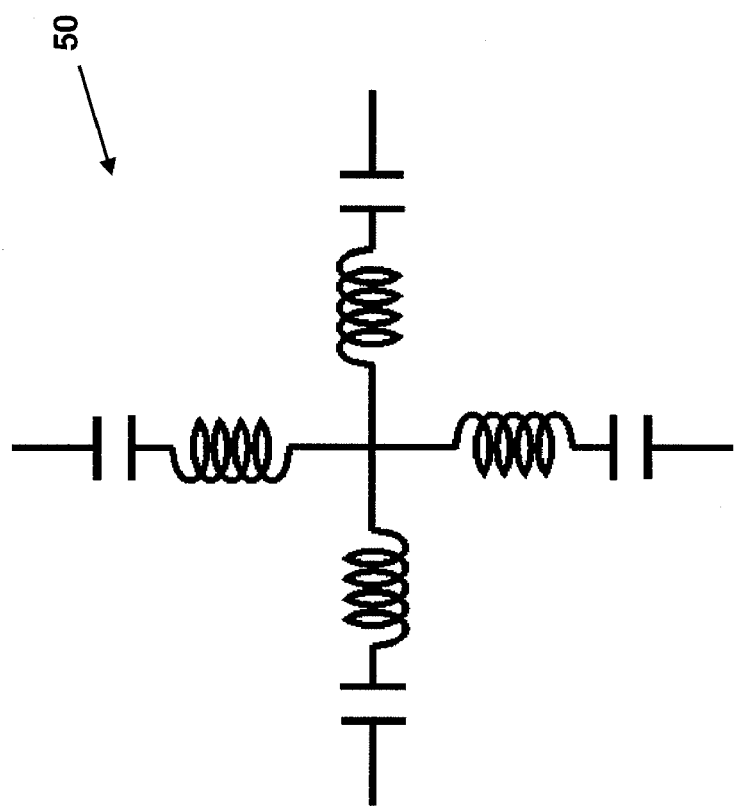
FIG. 5 is a circuit diagram depicting the equivalent circuit for the frequency selective surface-wave guide of FIG. 3.

FIG. 4 is a schematic of an array 40 of Jerusalem Crosses 41. FIG. 5 is a circuit diagram depicting the equivalent circuit for the frequency selective surface-wave guide 30 of FIG. 3.

Figure 6:
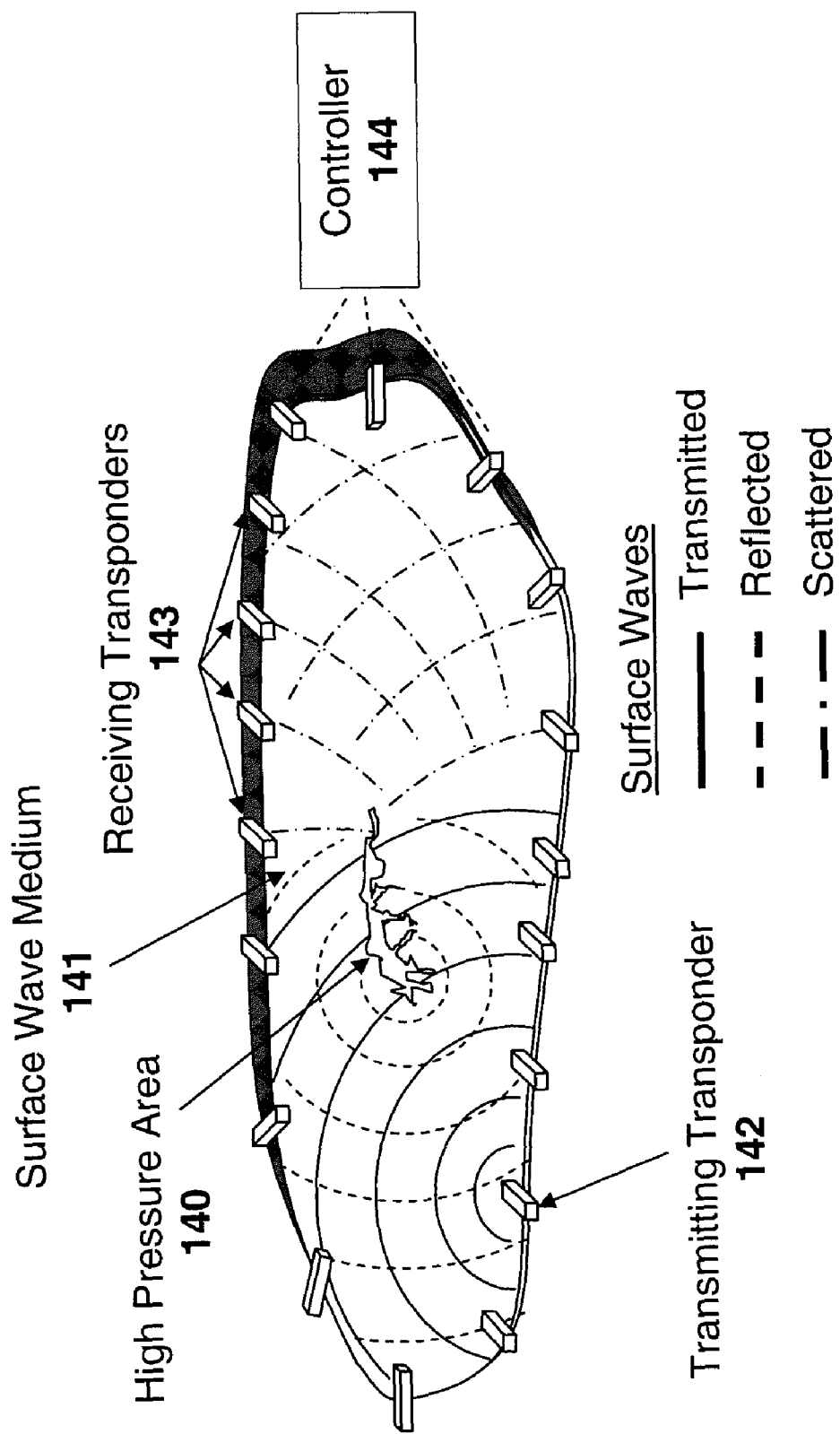
FIG. 6 is a diagram depicting surface pressure detection with electromagnetic surface waves.

FIG. 6 is a diagram depicting surface pressure detection with electromagnetic surface waves. In an exemplary embodiment of the present invention, the system and method provide for remotely mapping pressure profiles in real time. Such a system and method could be useful for pressure sensing on aircraft control surfaces, especially in conjunction with active material control surfaces.

According to an exemplary embodiment of the present invention, a system and a method of remotely mapping the pressure profile on a surface are provided. The method includes launching an electromagnetic surface wave across a surface and mapping its propagation characteristics. Pressure variations 140 squeeze a compressible layer on the surface. A pressure-induced variation 140 on the surface-wave material 141 leads to local changes in the surface wave propagation characteristics, causing the surface waves to reflect, refract, and diffract around the variations. The surface wave propagation characteristics are then a function of the pressure across the surface. The pressure mapping is correlated to the surface wave propagation. The system is realized using a thin layer of surface-wave medium 141 that is laminated to the surface under evaluation. The surface-wave medium 141 has several surface wave transponders 142, 143 located at its perimeter. A minimum of two transponders are required. The resolution of the surface imaging increases with the number of transponders.

The pressure is imaged by having each of the surface wave transponders 142 transmit an electromagnetic pulse that propagates along the surface and is measured by the other transponders 143 for time of flight, phase difference, and amplitude. Any pressure variation on the surface will modify the transmitted surface-wave propagation by reflecting, diffracting, and scattering the surface wave. The signals measured at each transponder 143 are the combination of the transmitted, reflected, and scattered waves. The amplitude and phase characteristics of the measured signals are dependent on the pressure variation across the surface. Each transponder 142 transmits an electromagnetic pulse that is measured by all of the other transponders 143. If there are N transponders, then there are N(N+1)/2 unique signals that are detected and analyzed for the image of the damage. The measured signals are analyzed and compared to the baseline signals by the controller 144 to create an image of the pressure on the surface.

Figure 7:
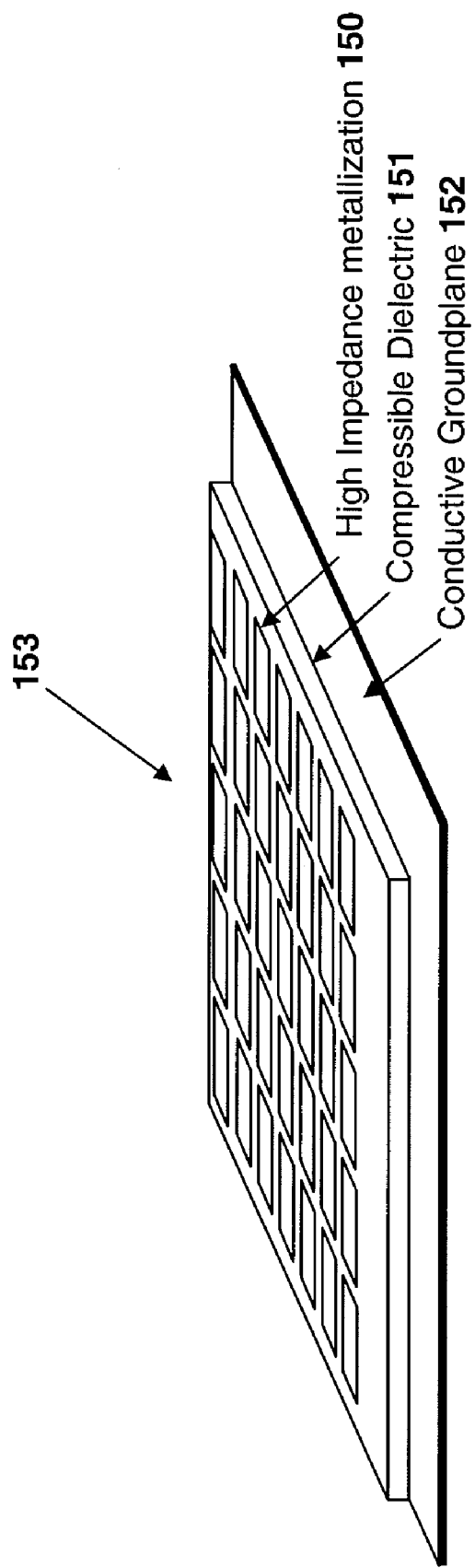
FIG. 7 depicts a surface-wave medium.

FIG. 7 depicts a surface-wave medium 153. A surface wave medium 153 is created by printing a periodic metallic pattern 150 on a dielectric material 151. The periodic metallic pattern 150 may be squares as depicted in FIG. 7, as depicted in FIG. 3, or some other periodic metallic pattern such as parallel or perpendicular hash marks. The metallic pattern 150 imposes a complex impedance boundary condition to the surface which traps electromagnetic radiation into waves tightly bound to the surface. In an exemplary embodiment, a thin compressible dielectric substrate 151 sits between the textured metallic layer 150 and a metallic ground plane 152. When the pressure changes, the compressible dielectric layer 151 compresses or expands, thereby changing the separation between the top layer 150 and the ground plane layer 152. The change in separation between the layers 150, 152 effectively changes the surface wave impedance and modifies the surface wave propagation characteristics. The surface wave propagation characteristics can be correlated to the pressure variation or changes in the pressure variation. Alternatively, the dielectric substrate 151 may be a pressure-sensitive dielectric material, such as a piezo-electric material that exhibits changes in permittivity when exposed to pressure changes.

In summary, the surface being monitored for surface pressure is coated with a laminated surface-wave medium 141. The surface is surrounded with a set of surface wave transponders 142, 143 along its perimeter. Each transponder is capable of transmitting and receiving surface waves on the surface. The pressure variation 140 is detected by measuring the $N(N+1)/2$ signals generated by "pulsing" each transponder 142 in turn and measuring the phase and amplitude of the transmitted "pulse" on all of the other detectors 143. The signal measured at each transponder 143 is a combination of the transmitted signal and the components reflected by and scattered off the pressure variation. The surface-wave medium 153 may be formed by laminating a pressure-sensitive dielectric or a thin compressible dielectric 151 on top of a metallic ground plane 152 in order to produce the property of complex surface impedance. The surface impedance is determined by the size and spacing of the metal patches and the thickness of the dielectric 151 and its electrical properties, such as its permittivity, resistivity and permeability. When pressure is applied to the surface, the thickness of the compressible dielectric 151 changes or the permittivity of the pressure-sensitive dielectric changes and therefore causes a local change in the surface-wave impedance.

For some applications, it is desirable to place a pattern of metallization 150 on top of the dielectric in order to tailor the surface impedance for optimum propagation characteristics and confinement of the surface wave energy. As depicted in FIG. 7, the metallic pattern, in its simplest form, is a periodic pattern of square or rectangular patches arranged in an array. The size of the patches and their spacing determines the surface impedance and surface wave propagation characteristics of the surface-wave medium 153. The geometry of the patches can take on any shape desired, which may include complicated interlocking shapes or Jerusalem Crosses as depicted in FIG. 3 and FIG. 4. The array can be a periodic or a periodic rectangular, hexagonal, or any other tiling geometry.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of detecting surface pressure on a surface, comprising:
    transmitting electromagnetic surface waves onto the surface;
    receiving the electromagnetic surface waves upon being reflected, diffracted, refracted, scattered, or otherwise altered by pressure variations on the surface; and
    coordinating the transmitting and the receiving of the electromagnetic surface waves for imaging the pressure variations on the surface,
    wherein the surface includes a surface-wave medium and the surface-wave medium is pressure-sensitive.

2. The method as claimed in claim 1, wherein the surface-wave medium includes a compressible dielectric.

3. The method as claimed in claim 1, further comprising:
    transmitting the electromagnetic surface waves from a plurality of transmitters located at a perimeter of the surface and receiving the electromagnetic surface waves by the plurality of transmitters.

4. The method as claimed in claim 3, wherein the plurality of transmitters are coordinated to transmit and to receive the electromagnetic surface waves for imaging the pressure variations on the surface.

5. The method as claimed in claim 1, wherein the surface-wave medium is laminated to the surface.

6. The method as claimed in claim 2, wherein the surface-wave medium includes a conductive ground plane between the surface and the dielectric.

7. The method as claimed in claim 2, wherein the surface-wave medium includes a metallic pattern on the dielectric for increasing an inductive reactance of the surface-wave medium.

8. The method as claimed in claim 7, wherein the metallic pattern is a periodic.

9. The method as claimed in claim 7, wherein the metallic pattern is a periodic metallic pattern of squares, rectangles, parallel or perpendicular hash marks, or Jerusalem crosses.

10. The method as claimed in claim 1, further comprising:
    analyzing the received electromagnetic surface waves and comparing the received electromagnetic surface waves to baseline signals for imaging the pressure variations on the surface.

11. A method of forming a surface pressure detection system on a surface, comprising:
    locating a plurality of transponders on the surface for transmitting electromagnetic surface waves and for receiving the electromagnetic surface waves upon being reflected, diffracted, refracted, scattered, or otherwise altered by pressure variations on the surface; and
    coupling the plurality of transponders to a controller, the controller being adapted to coordinate the plurality of transponders for imaging the pressure variations on the surface,
    wherein the surface includes a surface-wave medium and the surface-wave medium is pressure-sensitive.

12. The method as claimed in claim 11, wherein the surface-wave medium includes a compressible dielectric.

13. The method as claimed in claim 11, further comprising:
    locating the plurality of transponders at a perimeter of the surface.

14. The method as claimed in claim 11, further comprising:
    laminating the surface-wave medium to the surface.

15. The method as claimed in claim 12, wherein the surface-wave medium includes a conductive ground plane between the surface and the dielectric.

16. The method as claimed in claim 12, wherein the surface-wave medium includes a metallic pattern on the dielectric for increasing an inductive reactance of the surface-wave medium.

17. The method as claimed in claim 16, wherein the metallic pattern is aperiodic.

18. The method as claimed in claim 16, wherein the metallic pattern is a periodic metallic pattern of squares, rectangles, parallel or perpendicular hash marks, or Jerusalem crosses.

19. A method of forming a surface pressure detection system on a surface, comprising:
    laminating a surface-wave medium to the surface, the surface-wave medium including a conductive ground plane, a compressible dielectric or a pressure-sensitive dielectric on the ground plane, and a metallic pattern on the dielectric for increasing an inductive reactance of the surface-wave medium;

locating a plurality of transponders at a perimeter of the surface for transmitting electromagnetic surface waves and for receiving the electromagnetic surface waves upon being reflected, diffracted, refracted, scattered, or otherwise altered by pressure variations on the surface; and coupling the plurality of transponders to a controller, the controller being adapted to coordinate the plurality of transponders for imaging the pressure variations on the surface.

20. A system for detecting surface pressure on a surface, comprising:

a plurality of transponders on the surface for transmitting electromagnetic surface waves and for receiving the electromagnetic surface waves upon being reflected, diffracted, refracted, scattered, or otherwise altered by pressure variations on the surface; and a controller coupled to the plurality of transponders, the controller being adapted to coordinate the plurality of transponders for imaging the pressure variations on the surface, wherein the surface includes a surface-wave medium and the surface-wave medium is pressure-sensitive.

21. The system as claimed in claim 20, wherein the surface-wave medium includes a compressible dielectric.

22. The system as claimed in claim 20, wherein the plurality of transponders are located at a perimeter of the surface.

23. The system as claimed in claim 20, wherein the surface-wave medium is laminated to the surface.

24. The system as claimed in claim 21, wherein the surface-wave medium includes a conductive ground plane between the surface and the dielectric.

25. The system as claimed in claim 21, wherein the surface-wave medium includes a metallic pattern on the dielectric for increasing an inductive reactance of the surface-wave medium.

26. The system as claimed in claim 25, wherein the metallic pattern is aperiodic.

27. The system as claimed in claim 25, wherein the metallic pattern is a periodic metallic pattern of squares, rectangles, parallel or perpendicular hash marks, or Jerusalem crosses.

28. The system as claimed in claim 20, wherein the controller is further adapted to analyze the received electromagnetic surface waves and to compare the received electromagnetic surface waves to baseline signals for imaging the pressure variations on the surface.

29. A system for detecting surface pressure on a surface, comprising:

a surface-wave medium laminated to the surface, the surface-wave medium including a conductive ground plane, a compressible dielectric or a pressure-sensitive dielectric on the ground plane, and a metallic pattern on the dielectric for increasing an inductive reactance of the surface-wave medium;

a plurality of transponders located at a perimeter of the surface for transmitting electromagnetic surface waves and for receiving the electromagnetic surface waves upon being reflected, diffracted, refracted, scattered, or otherwise altered by pressure variations on the surface; and a controller coupled to the plurality of transponders, the controller being adapted to coordinate the plurality of transponders, to analyze the received electromagnetic surface waves, and to compare the received electromagnetic surface waves to baseline signals for imaging the pressure variations on the surface.

* * * * *